United States Patent [19]

Ernstbrunner

[11] Patent Number: 5,199,987

[45] Date of Patent: Apr. 6, 1993

[54] METHOD OF PRODUCING CEMENT CLINKER

[75] Inventor: Ludwig Ernstbrunner, Bad Fischau Brunn, Austria

[73] Assignees: Wopfinger Stein- und Kalkwerke Schmid & Co., Waldegg/Wopfing; PWA Ortmann Aktiengesellschaft, Vienna, both of Austria

[21] Appl. No.: 800,528

[22] Filed: Dec. 2, 1991

[30] Foreign Application Priority Data

Nov. 30, 1990 [AT] Austria ................ 2428/90

[51] Int. Cl.$^5$ ................ C04B 7/43
[52] U.S. Cl. ................ 106/761; 106/745; 106/771
[58] Field of Search ................ 106/745, 761, 771, 758, 106/763

[56] References Cited

U.S. PATENT DOCUMENTS

| | | | |
|---|---|---|---|
| 4,081,285 | 3/1978 | Pennell | 106/745 X |
| 4,391,671 | 7/1983 | Azarniouch | 162/30.1 |
| 4,678,514 | 7/1987 | Deyhle et al. | 106/745 |
| 5,122,189 | 6/1992 | Garrett et al. | 106/758 X |

FOREIGN PATENT DOCUMENTS

| | | |
|---|---|---|
| 335330 | 3/1977 | Austria. |
| 0148723 | 11/1984 | European Pat. Off. . |
| WO83/03601 | 10/1983 | PCT Int'l Appl. . |
| 251558 | 5/1926 | United Kingdom . |
| 1405294 | 9/1975 | United Kingdom . |

OTHER PUBLICATIONS

Chemical Abstracts, vol. 95, No. 26, Abstract No. 224507v, Dec. 1981.
Chemical Abstracts, vol. 102, No. 4, Abstract No. 30999z, Jan. 1985.

*Primary Examiner*—Karl Group
*Attorney, Agent, or Firm*—Herbert Dubno

[57] ABSTRACT

A rotary cement kiln is operated with predried paper sludge in a secondary combustion period. The predrying of the paper sludge from a moisture content of about 50% by weight to a moisture content of about 30% by weight is effected with flue ga from the inlet end of the rotary kiln.

9 Claims, 1 Drawing Sheet

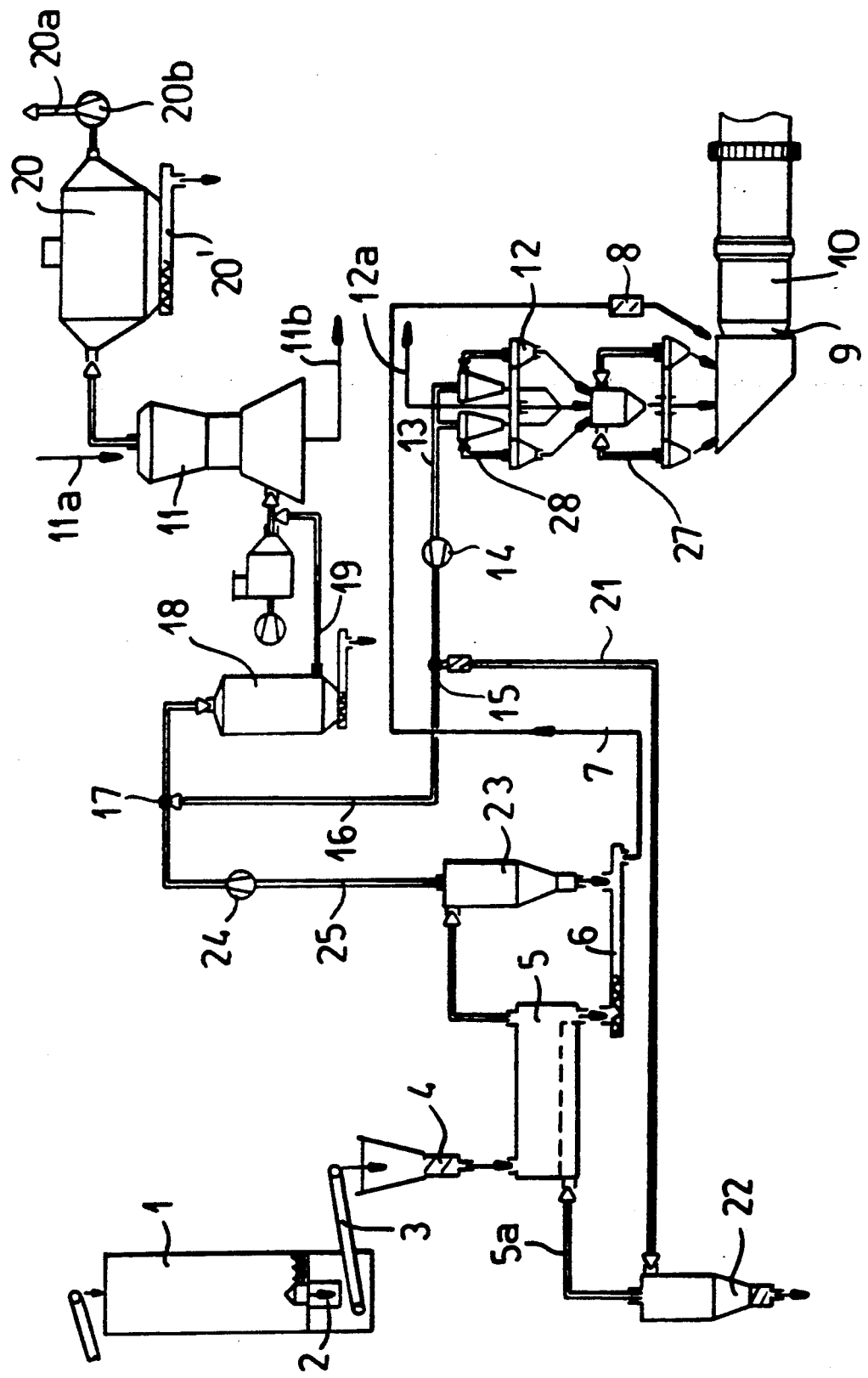

METHOD OF PRODUCING CEMENT CLINKER

FIELD OF THE INVENTION

My present invention relates to a method of producing cement clinker by the firing of mineral cement clinker precursors in a rotary cement kiln. More particularly, the invention relates to a method of this type in which a low-grade combustible material is fed to the inlet end of the cement kiln to participate in a secondary combustion at this inlet end of the kiln or therealong.

BACKGROUND OF THE INVENTION

The general elimination of landfill sites and the increase in landfill costs have created a significant problem in industrial nations for waste and rubbish disposal and have increased the demand for systems which reduce the landfill volume requirements for such disposal.

In the paper industry, there is a problem with the disposal of paper sludges or slurries which have no better use and which in the past have had to be incinerated with tree bark or other fuels. Even in such cases, ash is produced which must be dumped in landfills. With time, the costs of this disposal have increased and the problem of available landfill sites has affected the disposal of such ash as well.

Paper sludge or slurry may have up to about 50% water, the balance being short cellulose fibers and so-called fillers The fillers which are used in the paper industry are natural mineral materials like kaolin and calcium carbonate.

In the production of cement clinker utilizing conventional dry process techniques, i.e. rotary cement kilns (see, for example Chemical and Process Technology Encyclopedia, Considine, McGraw Hill, Inc., New York, 1974, pages 237 ff), it is known to produce a secondary combustion at the rotary kiln inlet utilizing low-grade fuels such as rubber tire scrap, coal-containing residues, oil sludges or the like to cover a portion of the overall energy requirement for the process and thus reduce the energy for the primary firing.

It should be evident that fuels which have a high moisture content, for example, substances which are so moist that the evaporation energy for driving off the moisture will exceed the contribution to the combustion energy of the fuel substances within the composition, will be of little value in such process since there is little if any energy saving through the use of such compositions. For example, clarifier sludges can only be used as fuels in a practical way if they are dried utilizing an external energy source, stored and then introduced into the cement-making process. Such systems have the drawback that there may not be any overall energy saving although the process does allow the destruction of a waste which might otherwise occupy a landfill.

In British patent 251,558 it has been proposed to utilize exhaust gases from the oven or kiln for the drying of low-grade fuels. It is also known to introduce the ash produced by the drying and incineration of wastes into a cement-making process.

OBJECTS OF THE INVENTION

It is, therefore, the principal object of the present invention to provide an improved process for reducing landfill requirements for the disposal of paper sludge, whereby drawbacks of earlier techniques can be avoided.

Another object of the invention is to provide an improved method of making cement clinker which is energetically more efficient than earlier methods.

Still a further object of my invention is to provide a method of producing cement clinker which will allow the use of high water content paper sludge or slurry without the disadvantages of earlier cement-making processes.

SUMMARY OF THE INVENTION

These objects and others which will become apparent hereinafter are attained, in accordance with the present invention, in a method wherein the exhaust gases or flue gases from the rotary cement-making kiln are utilized to dry a paper slurry or sludge which consists about one-half by weight of water and about one-half by weight of dry substance, to low-grade fuel which can contain up to 30% water and which is introduced into the rotary kiln at the inlet of the mineral matter to the latter to sustain a secondary combustion in the kiln.

The paper sludge contributes energy to the cement-making process and thus improves the energy efficiency thereof, the process eliminating the need for more expensive dewatering and incinerating methods and enabling the incorporation of any ash which is formed in the combustion directly into the cement-making process. Indeed, the ash produced is so fully integrated into the cement-making process that it contributes mineral matter which otherwise would have to be supplied from some other source.

According to a feature of the invention the flue gas is used to dry the paper sludge or slurry to the water content of substantially 30 weight percent after it has passed through a raw meal preheater in which it can pass directly into contact with the milled inorganic components adapted to form clinker and as collectively referred to herein as the raw meal. The raw meal can include silica, alumina, calcium oxide and, if desired, iron oxide in proper proportions for the formation of cement clinker or in the form of clay or mineral matter containing these constituents.

The raw meal preheater may include a drier for the raw meal or a recovery device or apparatus for the raw meal.

More particularly, the flue gas which is used for the drying operation may be subdivided into a main stream which can traverse the milling drier, preheater and/or recovery unit for the raw meal and a minor stream which is subjected to cleaning and is introduced into a drying unit, for example, a vibrating dryer or a drying drum to predry the paper sludge.

This partial stream can be recombined with the main stream after leaving the dryer and following recovery of paper residues therefrom in a suitable separator.

According to the invention, the moisture content of the paper sludge can be reduced, prior to its use in the secondary combustion, to a level enabling the heat content of the paper to contribute to the cement production without detriment since the thermal energy required for the drying of the sludge is derived from energy carried out of the rotary kiln with the flue gases. The overall energy consumption of the process can be reduced.

The invention eliminated the need for enrichment of the fuel in the cement raw meal added at the inlet, thereby eliminating the presence in the flue gases of uncombusted fuel.

The ash from the paper sludge allows reduction in components of the raw meal in the production of standard cement clinker BRIEF DESCRIPTION OF THE DRAWING

The above and other objects, features and advantages of the present invention will become more readily apparent from the following description, reference being made to the accompanying drawing, the sole FIGURE of which is a flow diagram of a plant for carrying out the method of the invention.

SPECIFIC DESCRIPTION

The cement plant of which a portion is represented in the drawing, can have a rotary kiln 10 of which only the inlet end is shown, i.e. the end supplied with the raw meal in the form of milled limestone and silicate mixture. The primary firing, the recovery of the cement clinker and its processing, and even the storage silos or bins for the cement clinker precursors can correspond to those shown in the Chemical and Process Technology Encyclopedia, Op. Cit.

According to the present invention, a storage silo 1 for the storage of a weight paper sludge, which generally comprises 50% dry substance and the balance water and which has a heat value in terms of the dry substance of about 6700 kJ/kg, has at its lower end a discharge and metering unit 2 feeding a metering conveyor 3. By stepless control of the speed of the metering conveyor, the rate of feed of the moist paper sludge is controlled to the demand at the rotary kiln 10.

Through a motor-driven gate 4, the moist paper sludge is fed to a drying device 5 which can be constructed as a vibratory dryer, a drying drum or the like. The flue gas enters the dryer 5 at 5a at a temperature of about 350° to 370° C.

A conveyor worm 6 and a chute system 7 connected therewith can delivery the predried paper sludge with a moisture content of about 30 weight percent, to a gate 8 and from the latter to an inlet 9 of the rotary cement kiln 10 to sustain a secondary combustion in this region. The starting materials introduced at the inlet end of the rotary kiln pass gradually through the latter and by the heating of this kiln (see Chemical and Process Technology Encyclopedia, page 237 ff, Op. Cit.) is transformed into the cement clinker.

The limestone and silicate mixtures (clays) forming the starting materials are milled in a milling/drying unit 11 and fed to a silo or silos as described in Chemical and Process Technology Encyclopedia, the milling/drying unit 11 being connected to a gas-cleaning filter 20 having a conveyor worm 20' likewise feeding the silos. A raw material inlet is shown at 11a and an outlet for the solids is shown at 11b of the milling drying unit. The feed from the silos to a raw meal preheater 12 is represented at 20a. The milled raw material forming the raw meal is subjected to preheating in the raw meal preheater 12 in a plurality of stages and the raw meal from a plurality of streams is supplied to the rotary kiln inlet 9 as has been indicated diagrammatically in the drawing.

The flue gases from the rotary kiln emerge at the inlet 9 and are passed via lines 27, 28 through the raw meal preheater 12 in which they contact directly the starting material to further preheat it. The gases are then carried away by a flue gas line 13 and a flue gas suction blower 14 to a branch point 15.

The major part of the flue gas, approximately 80% by volume, is fed as a main stream via line 16 to a location 17 and from this location through a kiln tower 18 and a line 19 to the milling and drying unit 11. From the latter, the gases traverse the filter 20 and are then released into the atmosphere at 20a via a blower 20b.

From the branch point 15, a line 21 carrying the minor stream of gas and dust, passes to a device 22, such as a cyclone, for removing the residual dust. The cleaned gas is fed to the gas inlet 5a of the drying unit 5.

After traversing this drying unit, the gas at a temperature of about 170° C., is passed through a paper residue separator 23 which can also be a cyclone and which has its solids outlet delivering the paper residue to the conveyor 6 which, as previously described, feeds the predried paper sludge to the rotary kiln.

The drying gas, practically freed from paper particles, passes via a line 25 and a blower 24 to the location 17 at which it joins the main gas stream fed to the cooler 18 and the milling dryer 11.

The invention enables the drying, incineration and ash utilization from wet paper sludge without the need for intermediate storage of the dried material after the drying and as an energy contributor for direct utilization in the secondary combustion in a rotary cement kiln. The drying gas emerging from the rotary kiln or from the raw meal preheat, before utilization in the drying unit 5, is subjected to a precleaning in a conventional cyclone 22 which at least assists in ensuring that the gases emerging from the drying are largely free from paper residue and avoids enriching the cement raw meal in fuels. This in turn guarantees that the unburned combustible content of the gasses discharged into the atmosphere is minimized.

In practice, it has been found that the ash resulting from the combustion of the paper sludge does not require landfill disposal but rather reduces the need for some other components in the raw meal in the production of high-quality standard cement clinker. This is shown by the following raw meal analysis

| | RAW MEAL ANAYLSIS | |
|---|---|---|
| | Without Paper Sludge in wt. % | With Paper Sludge in wt. % |
| $SiO_2$ | 13.8 | 13.4 |
| $Al_2O_3$ | 3.7 | 3.6 |
| $Fe_2O_3$ | 1.3 | 1.4 |
| CaO | 42.8 | 43.3 |
| Balance | Combination losses, $K_2O$, $SO_3$, MgO | |
| Silicate Modulus | 2.76 | 2.68 |
| Lime Standard | 98.1 | 102.0 |

Heat utilization without paper sludge addition about 3600 kJ/kg of clinker. Heat consumption with paper sludge addition 3300 kJ/kg of clinker.

The invention was found to be applicable to paper sludges with a dry content of 34.3 to 51.8% by weight, an ash content of 43.5 to 66.0% by weight, and a heat value of 5,470 to 8,580 kJ/kgTS.4. The ash content analysis was approximately 29% CaO, 2.5% MgO, 0.5% $SO_3$, 35% $SiO_2$, 32% $Al_2O_3$ and 1% $Fe_2O_3$. The energy requirement of the system could be satisfied to 8% by the paper sludge (70 kcal/kg of clinker, 294 kJ/kg of clinker) and 92% by fuel oil (790 kcal/kg of clinker, 3318 kJ/kg of clinker). The use of the process of the invention does not affect normal cement kiln temperatures. The sintering temperature of about 1500° C.

remains unaltered; the secondary combustion temperature is estimated at 1,000° C. With a normal ratio of say 75% by weight limestone, 20% by weight clay and 5% by weight quartz sand in the raw mineral to be supplied, the total charge could be 2% to 10% paper sludge as described, the balance to 100% of the raw mineral composition.

I claim:

1. A process for producing cement clinker which comprises the steps of:
    (a) feeding into an inlet end of a rotary cement kiln inorganic cement clinker precursors;
    (b) subjecting said inorganic cement clinker precursors in said kiln to a primary firing to form a cement clinker and produce a hot flue gas, said hot flue gas being discharged from said inlet end of said kiln;
    (c) drying a paper sludge having a water content of about 50% with said hot flue gas to a predried paper sludge with a water content of about 30% by weight; and
    (d) introducing said predried paper sludge into said inlet end of said rotary kiln and sustaining therewith a secondary combustion at said inlet end, whereby ash from said secondary combustion is incorporated in said cement clinker.

2. The process defined in claim 1, further comprising the step of subdividing the hot flue gas from said rotary kiln into a main stream and a minor stream, said minor stream contacting said paper sludge for drying same in step (c), said method further comprising the step of milling and drying at least one of said precursors with said main stream.

3. The process defined in claim 2, further comprising the step of precleaning said minor stream by removing paper particle therefrom prior to drying said paper sludge with its minor stream in step (c).

4. The process defined in claim 3, further comprising the step of recombining said minor stream after step (c) with said main stream before said main stream is used for milling and drying of said one of said precursors.

5. The process as defined in claim 4, further comprising the step of precleaning said minor stream after step (c) and before recombining said minor stream with said main stream.

6. The process as defined in claim 5 wherein paper recovered from said minor stream after step (c) is fed with the predried paper sludge to said inlet of said kiln for said secondary combustion.

7. The process as defined in claim 6 wherein said flue gas is contacted with said precursors for preheating same before said precursors are admitted to said rotary kiln.

8. The process as defined in claim 7, further comprising adjusting amounts of said precursors into said rotary kiln in accordance with contribution to said cement clinker from said ash.

9. The process as defined in claim 8, further comprising cooling said main stream after recombination of said minor stream therewith and prior to milling and drying of said one of said precursors with said main stream.

* * * * *